(12) United States Patent
Wang et al.

(10) Patent No.: US 10,296,117 B2
(45) Date of Patent: May 21, 2019

(54) TOUCH CONTROL DISPLAY SUBSTRATE AND TOUCH CONTROL DISPLAY DEVICE

(71) Applicants: BOE TECHNOLOGY GROUP CO., LTD., Beijing (CN); BEIJING BOE OPTOELECTRONICS TECHNOLOGY CO. LTD., Beijing (CN)

(72) Inventors: Lei Wang, Beijing (CN); Yingming Liu, Beijing (CN); Xiaochuan Chen, Beijing (CN); Wenbo Jiang, Beijing (CN); Yue Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 1 day.

(21) Appl. No.: 15/301,203

(22) PCT Filed: Jun. 18, 2015

(86) PCT No.: PCT/CN2015/081733
§ 371 (c)(1),
(2) Date: Sep. 30, 2016

(87) PCT Pub. No.: WO2016/119375
PCT Pub. Date: Aug. 4, 2016

(65) Prior Publication Data
US 2017/0017330 A1 Jan. 19, 2017

(30) Foreign Application Priority Data
Jan. 26, 2015 (CN) .......................... 2015 1 0038650

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/0412; G06F 3/0416; G06F 3/044
See application file for complete search history.

(56) References Cited

U.S. PATENT DOCUMENTS 8,188,982 B2   5/2012  You et al.
9,618,782 B2 *  4/2017  Yao ..................... G02F 1/13338
(Continued)

FOREIGN PATENT DOCUMENTS

CN   103838430 A   6/2014
CN   103995632 A   8/2014
(Continued)

OTHER PUBLICATIONS

International Search Report dated Oct. 13, 2015 corresponding to International Application No. PCT/CN2015/081733.
(Continued)

*Primary Examiner* — Ariel A Balaoing
(74) *Attorney, Agent, or Firm* — Nath, Goldberg & Meyer; Joshua B. Goldberg

(57) ABSTRACT

The present invention provides a touch control display substrate and a touch control display device, belongs to the field of touch control technology, and can solve the problem that a driver chip of an existing touch control display substrate is overloaded and display effect is poor. The touch control display substrate of the present invention includes a plurality of sensing areas for sensing a touch, each sensing area is provided therein with a sensing electrode for sensing a touch, each sensing area includes a position at which the (Continued)

sensing electrode is not provided, and the position at which the sensing electrode is not provided is provided with a common electrode. The touch control display device of the present invention includes the above touch control display substrate.

20 Claims, 2 Drawing Sheets

(56) References Cited

U.S. PATENT DOCUMENTS

| | | | | |
|---|---|---|---|---|
| 2012/0162096 A1* | 6/2012 | Lin | ................ | G06F 3/0416 345/173 |
| 2012/0274603 A1* | 11/2012 | Kim | ................ | G06F 3/0412 345/174 |
| 2013/0194224 A1* | 8/2013 | Lai | ................ | G06F 3/0412 345/174 |
| 2013/0241868 A1* | 9/2013 | Kim | ................ | G09G 3/3685 345/174 |
| 2014/0111466 A1* | 4/2014 | Kim | ................ | G06F 3/044 345/174 |
| 2014/0160061 A1* | 6/2014 | Kim | ................ | G02F 1/13338 345/174 |
| 2017/0003822 A1* | 1/2017 | Zhao | ................ | G06F 3/0412 345/174 |

FOREIGN PATENT DOCUMENTS

| | | |
|---|---|---|
| CN | 104020891 A | 9/2014 |
| CN | 104035639 A | 9/2014 |
| CN | 203882289 U | 10/2014 |
| CN | 104536631 A | 4/2015 |
| JP | 4687588 B2 | 5/2011 |

OTHER PUBLICATIONS

Written Opinion of the International Searching Authority dated Oct. 13, 2015 corresponding to International Application No. PCT/CN2015/081733.
First Office Action dated Feb. 4, 2017 in corresponding Chinese Patent Application No. 201510038650.X.

* cited by examiner

TOUCH CONTROL DISPLAY SUBSTRATE AND TOUCH CONTROL DISPLAY DEVICE

This is a National Phase Application filed under 35 U.S.C. 371 as a national stage of PCT/CN2015/081733, filed Jun. 18, 2015, an application claiming the benefit of Chinese Application No. 201510038650.X, filed Jan. 26, 2015, the content of each of which is hereby incorporated by reference in its entirety.

FIELD OF THE INVENTION

The present invention relates to the field of touch control technology, and particularly relates to a touch control display substrate and a touch control display device.

BACKGROUND OF THE INVENTION

A self-capacitive touch control structure comprises a plurality of sensing electrodes, each of which forms a capacitor together with the ground, and is connected to a port of a driver chip. The driver chip sends a sensing signal to the sensing electrode and then receives a feedback signal from the sensing electrode, and when a touch occurs, a finger or a stylus accesses a sensing electrode system to affect the capacitance thereof, and thus to change the feedback signal (for example, to change the delay of the feedback signal). Therefore, a touch position can be determined by analyzing the feedback signal and touch control can be achieved. A touch usually affects multiple sensing electrodes, and therefore, the specific touch position can be obtained by cooperative sensing of the multiple sensing electrodes.

To simplify structure and manufacturing process, in a touch control display substrate (an array substrate or a color filter substrate) of a liquid crystal display device, function of a common electrode can be incorporated into sensing electrodes, that is, the sensing electrodes are supplied with common voltage signals and function as the common electrode in a display phase, and are supplied with sensing signals in a touch control phase to achieve touch control.

Therefore, as shown in FIG. 1, the sensing electrodes 1 must be arranged closely in the touch control display substrate, and there can be an interval of only a few microns between adjacent sensing electrodes 1, since the sensing electrodes 1 also serve as the common electrode and display cannot be achieved at positions without the common electrode; meanwhile, each sensing electrode 1 needs to be connected to the driver chip individually, and therefore, the number of the sensing electrodes cannot be too much. Therefore, sizes of existing sensing electrodes 1 are too large (usually about 5 mm*5 mm), which causes the driver chip to be overloaded; furthermore, it is sensing signals, which cannot be used for normal display, that are supplied to the sensing electrodes 1 in the touch control phase, and although the touch control phase is relatively short, display effect is still affected.

SUMMARY OF THE INVENTION

In view of the problem that a driver chip of the existing touch control display substrate is overloaded and display effect is poor, the present invention provides a touch control display substrate and a touch control display device, which can not only decrease load of the driver chip but also guarantee display effect.

A technical solution employed to solve the above technical problem of the present invention is a touch control display substrate, comprising a plurality of sensing areas for sensing a touch, each sensing area is provided therein with a sensing electrode for sensing a touch, and each sensing area comprises a position at which the sensing electrode is not provided, and the position at which the sensing electrode is not provided is provided with a common electrode.

Preferably, the sensing electrode and the common electrode are provided in a same layer.

Preferably, each sensing electrode comprises a plurality of sub-sensing electrodes provided at intervals, and the plurality of sub-sensing electrodes of a same sensing electrode are connected by a first lead.

Further preferably, the plurality of sub-sensing electrodes in each sensing area are arranged in an array; wherein a distance between any two adjacent sub-sensing electrodes in each row is equal to a size of a sub-sensing electrode in a row direction, and a distance between any two adjacent sub-sensing electrodes in each column is equal to a size of a sub-sensing electrode in a column direction.

Further preferably, the sub-sensing electrodes are in a shape of rectangle.

Further preferably, the sub-sensing electrodes are in a shape of square.

Further preferably, at two adjacent sides of any two adjacent sensing areas, any one of the sub-sensing electrodes corresponds to the position at which the sub-sensing electrode is not provided in an adjacent sensing area.

Further preferably, each sub-sensing electrode corresponds to one pixel.

Preferably, the common electrode in each sensing area comprises a plurality of sub-common electrodes provided at intervals, and the plurality of sub-common electrodes are connected by a second lead.

Another technical solution employed to solve the above technical problem of the present invention is a touch control display device, comprising:

the above touch control display substrate.

In the touch control display substrate of the present invention, the size of the sensing electrode is smaller than that of the sensing area, therefore, the load of the driver chip can be decreased and the touch control effect can be guaranteed; moreover, the touch control display substrate comprises a common electrode, and the common voltage is applied to the common electrode in the touch control phase, which makes a corresponding pixel display normally and decreases impact of the sensing electrode on display.

Figure 1:
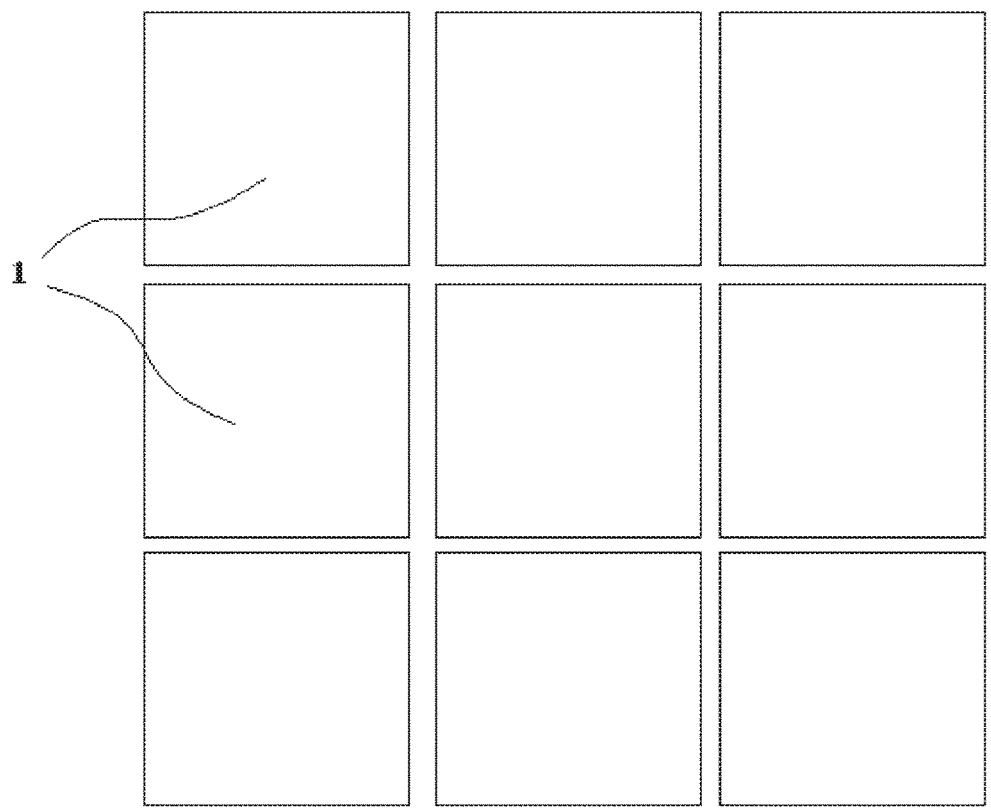
FIG. 1 is a schematic diagram of a structure of an existing sensing electrode.

Reference numerals: 1, sensing electrode; 11, sub-sensing electrode; 2, common electrode; 21, sub-common electrode; 41, first lead; 42, second lead; 9, sensing area

DETAILED DESCRIPTION OF THE EMBODIMENTS

In order to make those skilled in the art better understand the technical solutions of the present invention, the present invention is further described in detail below in conjunction with the accompanying drawings and specific implementations.

First Embodiment

Figure 2:
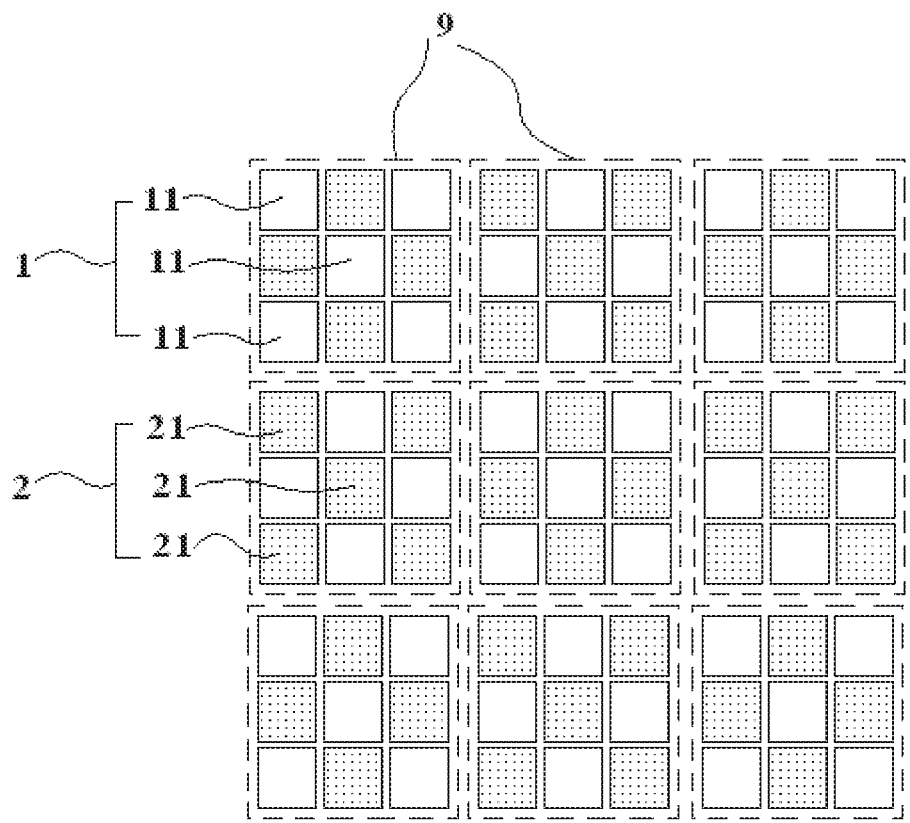
FIG. 2 is a schematic diagram of a structure of a touch control display substrate according to embodiments of the present invention.
Figure 3:
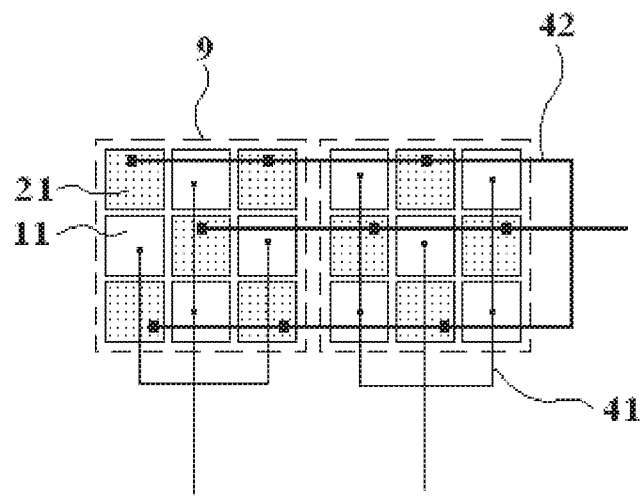
FIG. 3 is a schematic diagram illustrating connection of leads in a touch control display substrate according to embodiments of the present invention.

As shown in FIGS. 2 and 3, this embodiment provides a touch control display substrate.

The touch control display substrate is a substrate in which both a sensing electrode 1 for touch control and a display structure (such as a common electrode 2) for display are provided, that is, functions of touch control and display are integrated together in the touch control display substrate. Specifically, the touch control display substrate can be a color filter substrate in a twisted nematic mode (TN mode), in which the common electrode 2, a color filter film and the like are provided; or, the touch control display substrate can be an array substrate in an advanced super dimension switch mode (ADS mode), in which both a pixel electrode and the common electrode 2 are provided.

The touch control display substrate of this embodiment comprises a plurality of sensing areas 9 for sensing a touch, wherein each sensing area 9 is provided therein with a sensing electrode 1 for sensing a touch, and comprises a position at which the sensing electrode 1 is not provided, and the position at which the sensing electrode 1 is not provided is provided with a common electrode 2.

That is to say, the touch control display substrate of this embodiment is divided into a plurality of areas for sensing a touch, which is similar to the existing touch control display substrate; different from the existing touch control display substrate, the sensing electrode 1 of the touch control display substrate of this embodiment does not completely cover a sensing area 9, but are provided in the sensing area 9 at intervals, the rest portion of the sensing area 9 is vacated, and the vacated portion (namely, the position at which the sensing electrode 1 is not provided) is provided with the common electrode 2 which refers to an "exclusive" electrode only used for introducing a common voltage. Although the sensing electrode 1 does not completely cover the sensing area 9, since a touch will affect a certain range, the sensing electrode 1 provided in the sensing area 9 at intervals can still sense a touch when the touch occurs, and realization of the function of touch control will not be affected.

It can be seen that in the touch control display substrate of this embodiment, the actual area of the sensing electrode 1 is smaller than that of the sensing area 9 (5 mm*5 mm), therefore, under the condition that the number, position, size, interval and the like of the sensing areas 9 are the same, the actual area of each sensing electrode 1 decreases, and thus the load of a driver chip decreases and the touch control effect is guaranteed.

Simultaneously, since the touch control display substrate is provided therein with the common electrode 2, in a touch control phase, when a sensing signal is applied to the sensing electrode 1, the common voltage is still applied to the common electrode 2, so that normal display can be achieved in an area corresponding to the common electrode 2, which improves the display effect. In addition, in a display phase, the common voltage is applied to the sensing electrode 1 in a conventional manner (the common electrode 2 is supplied with the common voltage all the time), which can achieve a normal display.

In addition, in the touch control phase, signals respectively applied to the sensing electrode 1 and the common electrode 2 are different, and therefore, display effects thereof are also different. However, since the touch control display substrate of this embodiment is divided into a plurality of sensing areas 9, and each sensing area 9 (for example, an area of 5 mm*5 mm) is provided with both the sensing electrode 1 and the common electrode 2 at the same time, the sensing electrode 1 and the common electrode 2 are distributed uniformly on the whole, and the area of each sensing electrode 1 is not too large. Therefore, difference in display effect caused by the sensing electrode 1 is unobvious and will not be observed generally.

Certainly, it should be understood that, the above "sensing area 9" is an area which is provided on the display substrate and can achieve functions of display and sensing at the same time. Preferably, as shown in FIG. 2, the sensing areas 9 substantially cover the whole touch control display substrate (that is, there are only the smallest intervals inevitably existing between the sensing areas 9). Certainly, it is feasible that a predetermined interval (the interval can be provided with the common electrode 2 which does not belong to the common electrode 2 in the sensing area 9) is provided between adjacent sensing areas 9.

Preferably, the sensing electrode 1 and the common electrode 2 are provided in a same layer.

As stated above, the common electrode 2 is provided at the position at which the sensing electrode 1 is not provided, and there is no overlapped area therebetween, so the common electrode 2 and the sensing electrode 1 can be formed simultaneously by a single patterning process using a same transparent conductive material layer, so as to simplify structure and manufacturing process of product. Here, the above "provided in a same layer" means that two structures are formed by a same material layer, but does not mean that the two structures are definitely located at a same position in a thickness direction of the substrate.

Preferably, each sensing electrode 1 comprises a plurality of sub-sensing electrodes 11 provided at intervals, and the plurality of sub-sensing electrodes 11 of a same sensing electrode 1 are connected by a first lead 41.

That is to say, the sensing electrode 1 in one sensing area 9 can be divided into a plurality of portions (namely, the plurality of sub-sensing electrodes 11), the plurality of sub-sensing electrodes 11 are uniformly distributed in the sensing area 9, and thus the size of each sub-sensing electrode 11 is necessarily smaller, which makes it more difficult to observe the difference in display effect between the sensing electrode 1 and the common electrode 2. Since the sensing electrode 1 in one sensing area 9 needs to be connected to a port of the driver chip, the plurality of sub-sensing electrodes 11 can be connected by the first lead 41. Specifically, an insulating layer may be arranged between the first lead 41 and the sensing electrode 1 (the common electrode 2), and the first lead 41 is connected to the sub-sensing electrodes 11 through a via hole in the insulating layer; preferably, the first lead 41 can be provided in a same layer as a lead used for connecting the sensing electrode 1 to the driver chip.

Preferably, the plurality of sub-sensing electrodes 11 in each sensing area 9 are arranged in an array; wherein, a distance between any two adjacent sub-sensing electrodes 11 in each row is equal to a size of a sub-sensing electrode 11 in a row direction, and a distance between any two adjacent sub-sensing electrodes 11 in each column is equal to a size of a sub-sensing electrode 11 in a column direction.

That is to say, as shown in FIG. 2, the sub-sensing electrodes 11 can be arranged in an array, a position is vacated between two adjacent sub-sensing electrodes 11 in each row, a position is also vacated between two adjacent sub-sensing electrodes 11 in each column, and these vacated positions are provided with the above-described common electrode 2. The sub-sensing electrodes 11 in this form are distributed more uniformly and have a smaller impact on the display.

Certainly, it should be understood that, there should be an interval (such as an interval of several microns) inevitably existing between the neighbouring sub-sensing electrode 11 and common electrode 2 when the sub-sensing electrode 11 and the common electrode 2 are provided in a same layer, so as to avoid electrical connection therebetween, which is not contradictory to the case that the distance between the adjacent sub-sensing electrodes 11 is equal to the size of the sub-sensing electrode 11 as described above.

Preferably, the common electrode 2 in each sensing area 9 comprises a plurality of sub-common electrodes 21 provided at intervals, and the plurality of sub-common electrodes 21 are connected by a second lead 42.

That is to say, the common electrode 2 in a same sensing area 9 can be divided into a plurality of separate sub-common electrodes 21, and these sub-common electrodes 21 are electrically connected by the second lead 42. Such a manner is helpful to decrease of the size of a single sub-common electrode 21 and makes sub-common electrodes distribute more uniformly. As shown in FIG. 3, different from the sub-sensing electrodes 11, all the common electrodes 2 in the whole touch control display substrate can be electrically connected all together. For example, an insulating layer can be arranged between the second lead 42 and the common electrode 2 (the sensing electrode 1), and the second lead 42 is connected to the sub-common electrode 21 through a via hole in the insulating layer; preferably, the second lead 42 can be a conventional common electrode line, such as a common electrode line formed simultaneously with a gate line.

As shown in FIG. 3, when there is an intersection between the first lead 41 and the second lead 42, they should be arranged in different layers (for example, they are arranged above and below the sensing electrode 1/the sub-common electrode 21, respectively). For clarity, FIG. 3 shows the position relationship of projections of respective electrodes and leads only, but does not show the relationship of layers thereof, and in FIG. 3, bold points represent via holes for connecting leads and electrodes. Certainly, if the first lead 41 and the second lead 42 are not intersected, they can also be arranged in a same layer.

Preferably, the sub-sensing electrodes 11 are in a shape of rectangle, and more preferably, in a shape of square.

That is to say, the sub-sensing electrodes 11 are preferably in a shape of rectangle, correspondingly, areas without the sensing electrode 1 are also in a shape of rectangle, and the sub-common electrodes 21 are also in a shape of rectangle. In this way, the sub-sensing electrodes 11 and the sub-common electrodes 21 in each sensing area 9 are in a form of the chess board, each side of each sub-sensing electrode 11 is provided with the sub-common electrode 21, each side of each sub-common electrode 21 is provided with the sub-sensing electrode 11, and two kinds of electrodes are distributed most uniformly, which can minimize impact caused by difference in display effect between the sensing electrode 1 and the common electrode 2.

Preferably, at two adjacent sides of any two adjacent sensing areas 9, any sub-sensing electrode 11 corresponds to a position at which the sub-sensing electrode 11 is not provided (namely the position of the sub-common electrode 21) in an adjacent sensing area 9.

That is to say, even in adjacent sensing areas 9, an outside of the sub-sensing electrode 11 is preferably provided with the sub-common electrode 21 so that they are distributed more uniformly.

Preferably, each sub-sensing electrode 11 corresponds to one pixel. That is to say, a position of each sub-sensing electrode 11 just corresponds to one pixel, and correspondingly, each sub-common electrode 21 necessarily corresponds to one pixel. In this way, the size of the sub-sensing electrode 11 is minimized and the sub-sensing electrode 11 and the sub-common electrode 21 are distributed most uniformly, on the basis of the guarantee that there is no difference in display effect among pixels.

Certainly, it is feasible that each sub-sensing electrode 11 corresponds to a plurality of pixels or a portion of one pixel.

It should be understood that, although the above description is given by taking the sub-sensing electrode 11 and the sub-common electrode 21 for an example, it is also feasible that the sensing electrode 1 and/or the common electrode 2 in each sensing area 9 are/is connected as a whole.

Second Embodiment

This embodiment provides a touch control display device, comprising the above touch control display substrate.

Certainly, the touch control display device further comprises other known structures, such as a substrate assembled with the touch control display substrate, a driver chip used for providing the sensing electrode with a signal, a voltage source used for providing the common electrode with a common voltage, etc.

Specifically, the display device may be any product or component having a display function, such as a liquid crystal display panel, electronic paper, a mobile phone, a tablet computer, a TV set, a display, a notebook computer, a digital photo frame, a navigator, etc.

It could be understood that the above implementations are only exemplary implementations for illustrating the principle of the present invention, but the present invention is not limited thereto. Various variations and improvements can be made by those skilled in the art without departing from the spirit and essence of the present invention, and these variations and improvements are also considered to be within the protection scope of the present invention.

The invention claimed is:

1. A touch control display substrate, comprising a plurality of sensing areas for sensing a touch, each sensing area being provided therein with a sensing electrode for sensing a touch, wherein, each sensing area comprises a position at which the sensing electrode is not provided, and the position at which the sensing electrode is not provided is provided with a common electrode, wherein the plurality of sensing areas are arranged in an array, the sensing electrode in each sensing area comprises a plurality of sub-sensing electrodes provided at intervals, and the plurality of sub-sensing electrodes in each sensing area are arranged in an array, the common electrode in each sensing area comprises a plurality of sub-common electrodes provided at intervals, and the plurality of sub-common electrodes in each sensing area are arranged in an array, one of the plurality of sub-common electrodes is disposed between two adjacent sub-sensing electrodes along a row direction; and one of the plurality of sub-common electrodes is disposed between two adjacent sub-sensing electrodes along a column direction perpendicular to the row direction.

2. The touch control display substrate according to claim 1, wherein,
the sensing electrode and the common electrode are provided in a same layer.

3. The touch control display substrate according to claim 1, wherein,
the plurality of sub-sensing electrodes of a same sensing electrode are connected by a first lead.

4. The touch control display substrate according to claim 2, wherein,
the plurality of sub-sensing electrodes of a same sensing electrode are connected by a first lead.

5. The touch control display substrate according to claim 3, wherein,
a distance between any two adjacent sub-sensing electrodes in each row is equal to a size of a sub-sensing electrode in a row direction, and a distance between any two adjacent sub-sensing electrodes in each column is equal to a size of a sub-sensing electrode in a column direction.

6. The touch control display substrate according to claim 5, wherein,
the sub-sensing electrodes are in a shape of rectangle.

7. The touch control display substrate according to claim 6, wherein,
the sub-sensing electrodes are in a shape of square.

8. The touch control display substrate according to claim 5, wherein,
at two adjacent sides of any two adjacent sensing areas, any one of the sub-sensing electrodes corresponds to the position at which the sub-sensing electrode is not provided in an adjacent sensing area.

9. The touch control display substrate according to claim 3, wherein,
each sub-sensing electrode corresponds to one pixel.

10. The touch control display substrate according to claim 1, wherein,
the plurality of sub-common electrodes in each sensing area are connected by a second lead.

11. The touch control display substrate according to claim 2, wherein,
the plurality of sub-common electrodes in each sensing area are connected by a second lead.

12. A touch control display device, comprising
a touch control display substrate, the touch control display substrate comprising a plurality of sensing areas for sensing a touch, each sensing area being provided therein with a sensing electrode for sensing a touch, wherein,
each sensing area comprises a position at which the sensing electrode is not provided, and the position at which the sensing electrode is not provided is provided with a common electrode, wherein
the plurality of sensing areas are arranged in an array,
the sensing electrode in each sensing area comprises a plurality of sub-sensing electrodes provided at intervals, and the plurality of sub-sensing electrodes in each sensing area are arranged in an array,
the common electrode in each sensing area comprises a plurality of sub-common electrodes provided at intervals, and the plurality of sub-common electrodes in each sensing area are arranged in an array,
one of the plurality of sub-common electrodes is disposed between two adjacent sub-sensing electrodes along a row direction; and
one of the plurality of sub-common electrodes is disposed between two adjacent sub-sensing electrodes along a column direction perpendicular to the row direction.

13. The touch control display device according to claim 12, wherein the sensing electrode and the common electrode are provided in a same layer.

14. The touch control display device according to claim 12, wherein the plurality of sub-sensing electrodes of a same sensing electrode are connected by a first lead.

15. The touch control display device according to claim 14, wherein a distance between any two adjacent sub-sensing electrodes in each row is equal to a size of a sub-sensing electrode in a row direction, and a distance between any two adjacent sub-sensing electrodes in each column is equal to a size of a sub-sensing electrode in a column direction.

16. The touch control display device according to claim 15, wherein the sub-sensing electrodes are in a shape of rectangle.

17. The touch control display device according to claim 16, wherein the sub-sensing electrodes are in a shape of square.

18. The touch control display device according to claim 15, wherein at two adjacent sides of any two adjacent sensing areas, any one of the sub-sensing electrodes corresponds to the position at which the sub-sensing electrode is not provided in an adjacent sensing area.

19. The touch control display device according to claim 14, wherein each sub-sensing electrode corresponds to one pixel.

20. The touch control display device according to claim 12, wherein the plurality of sub-common electrodes in each sensing area are connected by a second lead.

* * * * *